(12) United States Patent
Anderson et al.

(10) Patent No.: US 7,743,087 B1
(45) Date of Patent: Jun. 22, 2010

(54) PARTITIONING DISTRIBUTED ARRAYS ACCORDING TO CRITERION AND FUNCTIONS APPLIED TO THE DISTRIBUTED ARRAYS

(75) Inventors: Penelope Anderson, Newton, MA (US); Cleve Moler, West Newbury, MA (US); Sheung Hun Cheng, Boston, MA (US); Patrick D. Quillen, Framingham, MA (US)

(73) Assignee: The Math Works, Inc., Natick, MA (US)

( * ) Notice: Subject to any disclaimer, the term of this patent is extended or adjusted under 35 U.S.C. 154(b) by 1077 days.

(21) Appl. No.: 11/387,565

(22) Filed: Mar. 22, 2006

(51) Int. Cl.
*G06F 15/16* (2006.01)

(52) U.S. Cl. .................. 709/201; 709/202; 709/248; 717/149

(58) Field of Classification Search .......... 709/201–202, 709/248–250; 714/28–29, 31–32; 717/103–104, 717/149, 151
See application file for complete search history.

(56) References Cited

U.S. PATENT DOCUMENTS

| 5,450,313 | A  | * | 9/1995  | Gilbert et al. ............... 717/151 |
| 5,721,928 | A  | * | 2/1998  | Umehara et al. ............ 717/149 |
| 5,781,777 | A  | * | 7/1998  | Sato et al. .................... 717/160 |
| 6,374,403 | B1 | * | 4/2002  | Darte et al. .................. 717/151 |
| 7,086,040 | B2 | * | 8/2006  | Joisha et al. ................. 717/137 |
| 7,127,701 | B2 | * | 10/2006 | Fables et al. ................ 709/203 |
| 7,418,470 | B2 | * | 8/2008  | Howard et al. .............. 709/201 |
| 7,542,981 | B2 | * | 6/2009  | Choy et al. .................. 717/149 |
| 7,543,184 | B2 | * | 6/2009  | Dean et al. .................... 714/32 |
| 7,634,530 | B2 | * | 12/2009 | Dean et al. .................. 709/201 |
| 2003/0126589 | A1 | * | 7/2003  | Poulsen et al. .............. 717/149 |

\* cited by examiner

*Primary Examiner*—Bharat N Barot
(74) *Attorney, Agent, or Firm*—Lahive & CockField, LLP; Kevin J. Canning

(57) ABSTRACT

The present invention provides a method and system for the dynamic distribution of an array in a parallel computing environment. The present invention obtains a criterion for distributing an array and performs flexible portioning based on the obtained criterion. In some embodiment analysis may be performed based on the criterion. The flexible portioning is then performed based on the analysis.

19 Claims, 4 Drawing Sheets

PARTITIONING DISTRIBUTED ARRAYS ACCORDING TO CRITERION AND FUNCTIONS APPLIED TO THE DISTRIBUTED ARRAYS

RELATED APPLICATION

This application is related to U.S. patent application Ser. No. 11/173,645 filed on Jun. 30, 2005 the specification of which is herein incorporated by reference.

TECHNICAL FIELD

The present invention generally relates to parallel computing. More particularly, the present invention relates to dynamic distribution of distributed arrays in the parallel computing environment.

BACKGROUND INFORMATION

MATLAB® is a product of The MathWorks, Inc. of Natick, Mass., that provides an environment for technical computing to engineers, scientists, mathematicians, and educators across a diverse range of industries. MATLAB® is an intuitive high performance language and a technical computing application that provides mathematical and graphical tools for mathematical computation, data analysis, visualization and algorithm development. As a desktop application, MATLAB® typically runs on a single computer. However, there is a limit to the complexity and the size of a problem that a single computer can solve. For example, for a data intensive program utilizing a few 1000 by 1000 arrays, there may not be enough processing power on the single computer to manipulate these arrays, or the program may take days to complete execution. Furthermore, there may not be enough memory on a processor to store one or more of the arrays needed for a data intensive program.

With many engineering and scientific problems requiring larger and more complex modeling, many scientists and engineers are interested in using parallel computing to solve their problems. Arrays are an integral part of technical computing and with distributed arrays, a user can employ more computing resources than with a single computer. U.S. patent application Ser. No. 11/173,645 discusses implementations of distributed arrays focused on evenly distributing arrays across multiple parallel processors. Flexible partitioning removes the limitation of having to evenly distribute the arrays across the parallel processors but introduces additional complexity in determining how an array is to be distributed.

Therefore, it is desirable to provide a technique that reduces the complexity in determining how arrays are partitioned to distribute them across multiple parallel processors.

SUMMARY OF THE INVENTION

The present invention relates in general to parallel computing. Specifically, the present invention is related to dynamic distribution of arrays in parallel computing in a technical computing environment. Operations performed on such distributed arrays are handled using flexible partitioning of the distributed array based on one or more criteria. Based on the established criterion, a partitioning scheme is used to perform a given operation. In some embodiments, rule sets are used to determine how distributed arrays are partitioned in performing an operation. The present invention provides a methodology for partitioning distributed arrays based on one or more goals established by one or more criteria.

In one aspect of the present invention, a method is provided for dynamically distributing arrays in a parallel computing environment. The method includes the steps of obtaining a criterion for the processing of such a distributed array and performing flexible partitioning based on obtained criteria. In certain embodiments, the method further includes performing analysis based on the criterion obtained. The criterion, how the flexible portioning is performed, and the analysis performed based on the criterion may each be specified by a user. In one embodiment of the invention, there may be predefined rules for partitioning arrays based on the desired criteria. Such rules may address the functions and manipulations with the arrays and what should be done in particular classes or individual operations. Certain embodiments of the present invention deal with the desire to minimize the communications between the processors as one of the criteria in distributing the arrays. Minimizing the communications may improve the overall performance.

In another aspect of the present invention, a computer-readable medium for holding instructions for dynamically distributing arrays in a parallel computing environment is provided. The instructions include the steps of obtaining a criterion for the distribution of an array, and performing flexible partitioning based on obtained criterion. In certain embodiments, the instructions further include the step of performing analysis based on the obtained criterion. The criterion, how the flexible portioning is performed, and the analysis performed based on the criterion may each by specified by a user.

In still another embodiment of the present invention, a system is provided for dynamically distributing arrays in a parallel computing environment. The system includes an application providing a parallel computing environment, a first parallel computing unit executing in the parallel computing environment, a second parallel computing unit executing in the parallel computing environment, and a dynamic distribution scheme for partitioning an array for distribution across the first and second parallel computing units based on an obtained criterion. In certain embodiments the dynamic distribution scheme, or portions thereof may be specified by a user The details of various embodiments of the invention are set forth in the accompanying drawings and the descriptions below.

BRIEF DESCRIPTION OF THE DRAWINGS

The foregoing and other objects, aspects, features, and advantages of the invention will become more apparent from the following description and accompanying drawings, in which like reference characters refer to the same parts throughout the different views.

DETAILED DESCRIPTION

The present invention provides a system and method for dynamically distributing an array in a parallel computing environment. In one aspect, the present invention is related to a method to execute a computer program in multiple execution environments. For a computer program utilizing a distributed array, the distributed array may be dynamically distributed across the multiple execution environments and each execution environment handles execution and calculation only for a portion of the distributed array. This provides an easy method for parallel processing of a distributed array executing on multiple computers and/or multiple processors to leverage the computing power of multiple computing resources. The automatic distribution also helps eliminate the requirement that the user of the parallel computing environment understand how to program parallel programming paradigms as well as how to best distribute or partition the distributed array.

With the availability of parallel computers, researchers and scientists are interested in parallel computing in a technical computing environment, such as, for example, MATLAB®. Arrays are an integral part of technical computing and in modern-day computation a single array may be large enough that an improvement in speed and latency may be achieved by distributing the single array across multiple computing resources. As used herein, arrays include matrices and multidimensional grids such as look-up tables.

With distributed arrays, a user can employ more computing resources than with a single computer. However, the implementation of the distributed arrays can affect the complexity of a computer program and user-visible side effects and performance. With identical low level parallel programming paradigms, different top level programming syntaxes can result in a very different user experience.

Figure 1A:
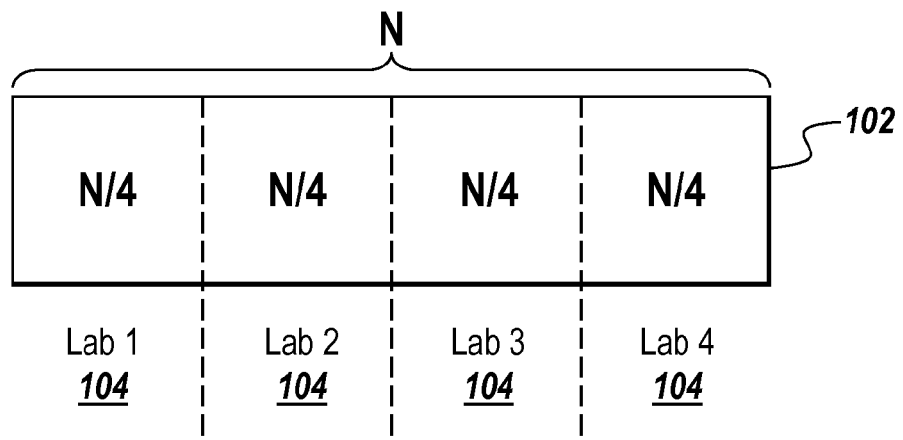
FIG. 1A is an exemplary depiction of a prior art distributed array evenly distributed across multiple processing units.

In U.S. patent application Ser. No. 11/173,645, a distributed array implementation for a parallel version of MATLAB has been introduced. The distribution scheme considered there largely addresses evenly distributing or partitioning the distributed array across the parallel processing units. The processing units may also be referred to as "labs." An example of even distribution can be seen in FIG. 1A. Here, a distributed array 102 having dimensionality of N is distributed over four (4) processing units or labs 104 with each partitioned as having N/4 of the distributed array 102.

Figure 1B:
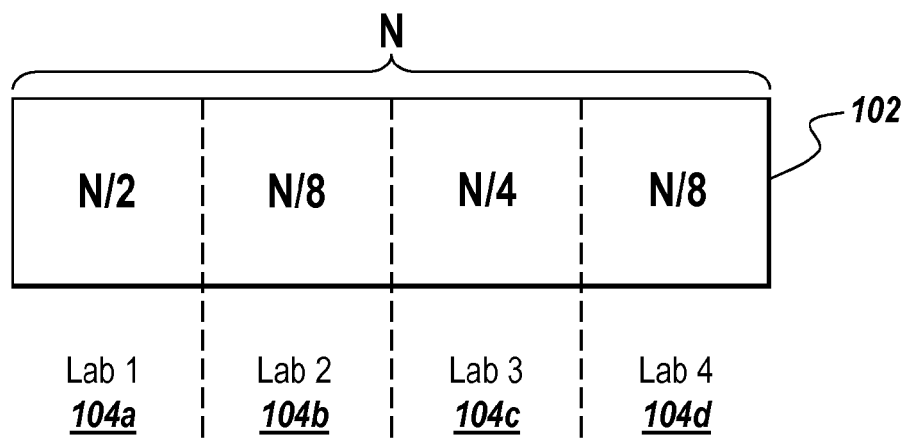
FIG. 1B is an example depiction of a distributed array wherein the distribution is not even across multiple processing units.

Flexible partitioning is built upon this concept and allows non-even distribution partitioning. An example of this can be seen in FIG. 1B. Here, the distributed array 102 having dimensionality N is again distributed across four (4) labs 104a, 104b, 104c, 104d. But, in this example the distributed array 102 is partitioned so that Lab 1 104a handles N/2 of the distributed array 102, Lab 2 104b handles N/8 of the distributed array 102, Lab 3 104c handles N/4 of the distributed array 102, and Lab 4 104d handles N/8 of the distributed array 102. The advantage of such flexible partitioning is that Lab 1 104a may have more resources available for processing so it can handle a larger portion on distributed array 102 while Labs 2 104b and Lab 4 104d have fewer resources available for processing, which necessitates Lab 2 104b and Lab 4 104d handling smaller portions of the distributed array 102. It will be understood that resource management is but one of several possible factors that flexible partitioning can be based upon. A disadvantage of flexible partitioning is that it now introduces nearly limitless possibilities for distribution of arrays and the processing of distributed arrays that compounds the complexity issue that distributed arrays were created to address.

The present invention addresses the above-mentioned problems by using one or more criteria to guide how flexible partitioning is to be handled in a parallel processing environment. In one aspect of the present invention, one or more criteria are considered for directing the handling of flexible partitioning. Thus, an array may be dynamically distributed based on the one or more criteria.

The illustrated embodiments will be described for illustrative purposes relative to a MATLAB® based application, however one of ordinary skill in the art will appreciate that the present invention may be applied to parallel execution of other applications such as LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc. The illustrative embodiment may also be applied in graphical modeling environments such as Simulink® for MATLAB®.

Figure 2:
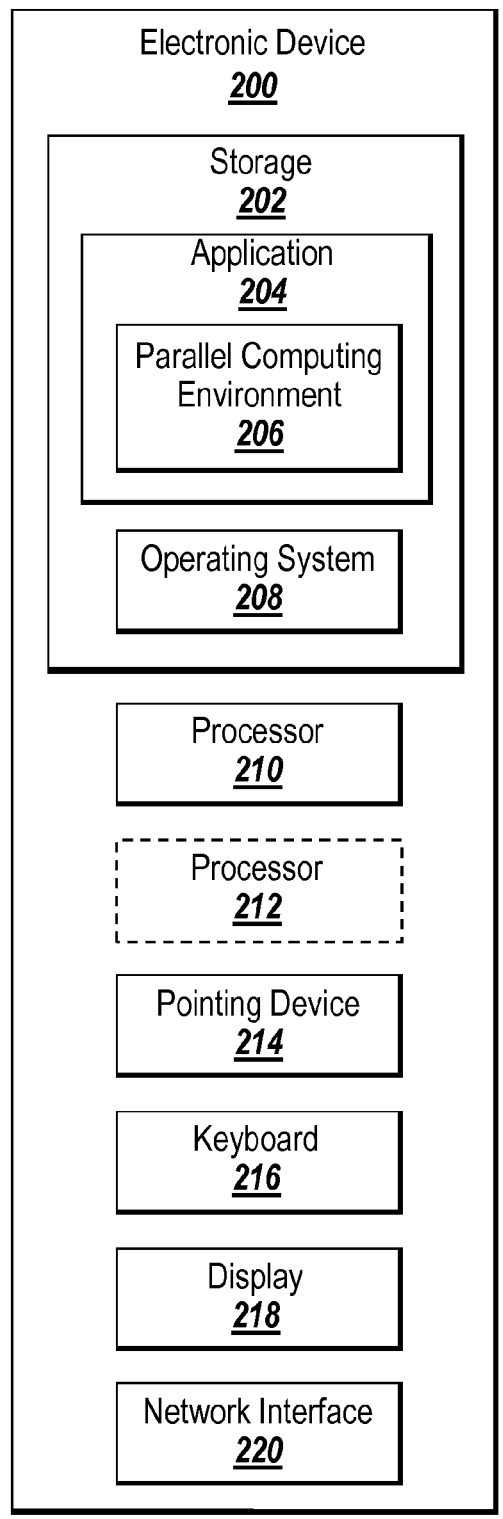
FIG. 2 is an exemplary computing device that is suitable for practicing one embodiment of the present invention.

FIG. 2 illustrates an exemplary computing device that is suitable for practicing an illustrative embodiment of the present invention. Computing device 200 includes storage 202, such as a hard drive or CD-ROM, for storing application 204 and operating system 208. Computing device 200 may be any computer system such as a desktop computer, laptop, workstation, server, handheld computer, or other form of computing or telecommunication device that is capable of communication and that has sufficient computing power to perform the operations described herein. Computing device 200 further includes a display 218 which a user may interact with computing device 200 using I/O devices such as a keyboard 216 and a pointing device 214 such as a mouse or stylus. A first processor 210 and optionally a second processor 212 are utilized by computing device 200 for running operating system 208, application 204, and other software in storage 202. One of ordinary skill in the art will appreciate that first and second processors 210 and 212 may be multiple core processors, multiple processors, other hardware component with computational capability, such as a microcontroller, application specific integrated circuit, field-programmable gate arrays, virtual machines or the like or any combination thereof.

Application 204 provides a parallel computing environment 206 that allows parallel processing of application 204 on the first and second processors 210 and 212. Application 204 is illustrated here as Parallel MATLAB® or a MATLAB® based application that is suitable for parallel or distributed processing. However, one of ordinary skill in the art will appreciate that the present invention may apply to other technical computing environments suitable for parallel or distributed processing. Computing device 200 may further include a network interface 220 to interface to a Local Area Network (LAN), Wide Area Network (WAN), or the Internet through a variety of connections including, but not limited to, standard telephone lines, LAN or WAN links, broadband connections, wireless connections, or some combination of any or all of the above. The network interface 220 allows computing device 200 to interface with another computing device that is capable of executing in the parallel computing environment to allow parallel processing on multiple computing devices.

Figure 3A:
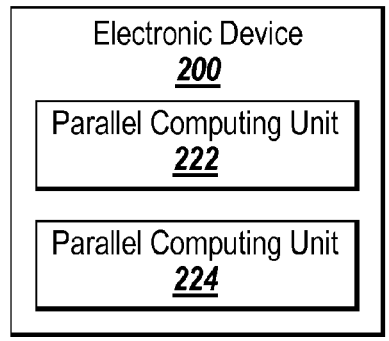
FIG. 3A is a block diagram of an exemplary distributed computing environment that is suitable to practice an embodiment of the present invention in a single computing device.

FIG. 3A illustrates a tightly coupled environment that is suitable for practicing the present invention. Computing device 200 includes a first parallel computing unit 222 and a second parallel computing unit 224. In this embodiment, a parallel computing unit may be a processor, a multiple core processor, multiple processors, or other hardware component with computational capability, such as a microcontroller, application specific integrated circuit, or field-programmable gate arrays.

Figure 3B:
FIG. 3B is a block diagram of another exemplary distributed computing environment that is suitable to practice one embodiment of the present invention via a network.

FIG. 3B illustrates another embodiment that is suitable to practice another exemplary parallel computing environment of the present invention. First parallel computing unit 222 communicates with second parallel computing unit 224 via network 228 such as a LAN, WAN, or wireless network. In this embodiment, a parallel computing unit may be a computing device such as computing device 200, a cluster of workstations or the like. One of ordinary skill in the art will appreciate that a distributed computing environment may comprise a combination of both embodiments illustrated in FIG. 3A and FIG. 3B as well as any number of parallel computing units.

In either of the embodiments shown in FIG. 3A and FIG. 3B, the first parallel computing unit 222 manages a first execution environment or lab and the second parallel computing unit 224 manages a second execution environment or lab. Each execution environment has a local copy of a computer program that is executed in the corresponding parallel computing unit, so there is no main parallel computing unit that distributes executions to the other parallel computing units.

The first execution environment and second execution environment are capable of communicating with each other via an interface. In an exemplary embodiment, the first execution environment and the second execution environment can communicate with each other by sending messages via a Message Passing Interface (MPI). MPI is a de facto standard for communication among the nodes running a parallel program on a distributed memory system. Implementation of the MPI specification permits programs with separate address spaces to synchronize with one another and move data from the address space of one process to that of another by sending and receiving messages. In another embodiment, the first and second execution environments may interface via socket based communications over TCP/IP implementing a custom message specification or other available message communications projects that allow the execution environments to send and receive messages.

A distributed array is implemented such that the executions of the distributed array are distributed or partitioned among the multiple execution environments or labs. Each of the parallel computing units stores locally a partitioned portion of the data contents of the distributed array. The multiple execution environments know which portion of the distributed array is stored on which of the multiple parallel computing units. A parallel computing unit performs execution only on the portion of the distributed array that is stored locally and if the parallel computing unit needs some portion of the distributed array that is not stored locally, it can send a message to other parallel computing units to request for the information needed.

In some embodiments, platform independent technology may be leveraged to achieve the distributed computations. For example, dynamic distribution may be performed on top of any general purpose scheduler. As such, no specific tailoring to the hardware is required at the user level. This enables the distribution to be achieved on heterogeneous clusters that may include different types of hardware and operating systems, as long as the scheduler and the application support them.

Flexible partitioning allows a distributed array to be partitioned across multiple execution environments or labs in any number of ways. In one embodiment of the present invention, a method is provided for dynamically distributing arrays in a parallel computing environment as shown in the flow diagram 400 of FIG. 4. In this example, the method comprises obtaining a criterion for the processing of a distributed array (step 410) and performing flexible partitioning based on obtained criterion (step 430).

In certain embodiments, the method further comprises performing analysis based on the obtained criteria.

The criterion acts as a guideline for how flexible partitioning should be handled. The distribution scheme is selected based on the criterion. In one exemplary embodiment the criterion comprises minimizing communication in the parallel computing environment. In order to achieve this goal, flexible distribution schemes are used. It should be understood that this is just one of the possible criteria. Other examples include, but are not limited to, maximizing use of execution environment resources, minimizing processing time, and profiling history. In certain embodiments multiple criteria may be obtained. In some embodiments where multiple criteria are obtained, a weighting scheme may be employed giving some criteria priority over others. Other possible criteria and embodiments will be apparent to one skilled in the art given the benefit of this disclosure.

The obtained criterion may be a default criterion or specified. In the current example, the criterion of minimizing communication in the parallel computing environment is a default criterion provided for handling flexible distribution of arrays provided by a parallel processing environment. In some embodiments of the invention, a criterion may be specified by a user, for example via a graphical user interface. In some such embodiments, the user may be prompted to select a criterion from pre-existing criterion choices. In other embodiments the criterion is specified by the parallel processing environment, the processing unit, other applications running on the processing unit, or other applications of devices in communication with the processing unit and environment. In some embodiments, a new criterion may be specified or provided. This allows for the extensibility of the present invention for as new situations or conditions occur new criterion may be created to address them. In certain embodiments, criteria may be provided via an Application Programming Interface (API). Other possible embodiments and configurations will be apparent to one skilled in the art given the benefit of this disclosure.

Once a criterion is obtained (step 410) then flexible partitioning may be performed based on the obtained criterion (step 430). In certain embodiments the flexible partitioning is performed according to instructions determined the criterion. In some instances the instructions may be the commands used to achieve the desired partitioning. In still further examples, the instructions may comprise the code for implementing a distribution scheme.

As with the criterion, the instructions may be default or specified by an operator such as user, device, or application. That is, once a criterion is obtained, a default set of instructions associated with the selected criterion may then be used or a new set of instruction may be provided for the selected criterion. In other embodiments where a new criterion is specified, instruction for implementing flexible partitioning in accordance with the new criterion may also be specified. In certain embodiments, criteria and corresponding instructions may be provided via an Application Programming Interface (API). Other embodiments and implementations will be apparent to one skilled in the art given the benefit of this disclosure.

Figure 4:
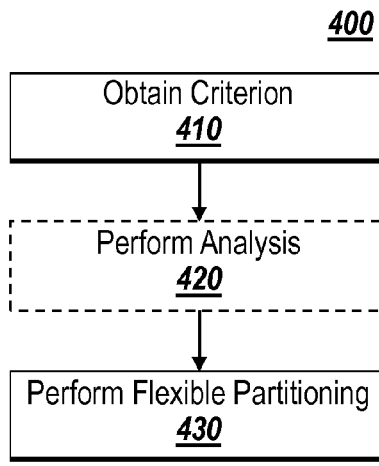
FIG. 4 is a flow diagram depicting an illustrative embodiment of a method of the present invention.

In one embodiment of the invention, the method shown in FIG. 4 further comprises the step of performing analysis based the criterion to determine how to perform flexible partitioning (step 420). In certain embodiments the analysis may also be performed as flexible partitioning is performed to allow for further adjustment to the dynamic distribution. As with the criterion and instructions, the analysis performed may be default or specified by an operator such as user, device, or application. That is, once a criterion is obtained a default analysis associated with the selected criterion may then be performed or a new analysis to be performed may be provided for the selected criterion. In other embodiments where a new criterion is specified, an analysis to be performed in accordance with the new criterion may also be specified. In certain embodiments, the analysis to be provided may be provided via an Application Programming Interface (API). Other embodiments and implementations will be apparent to one skilled in the art given the benefit of this disclosure. The flexible partitioning performed (step 430) may then be based on the results of the analysis. In some embodiments this may include determining the instructions to be used for implementing the flexible partitioning.

In some embodiments, the analysis (step 420) is performed using a rule set. The rules set may be rules for performing the analysis or rules performed as part of the analysis. The rule set may be default or specified by an operator such as user, device, or application. That is, once a criterion is obtained a default rule set associated with the selected criterion or performed analysis may then be utilized or a new rule set may be provided for the selected criterion or analysis. In other embodiments where a new criterion or analysis is specified, a new rule set in accordance with the new criterion or analysis may also be specified. In certain embodiments, the rule set may be provided via an Application Programming Interface (API). Other embodiments and implementations will be apparent to one skilled in the art given the benefit of this disclosure. The flexible partitioning performed (step 430) may then be based on the rule set. In some embodiments this may include determining the instructions to be used for implementing the flexible partitioning.

Figure 5:
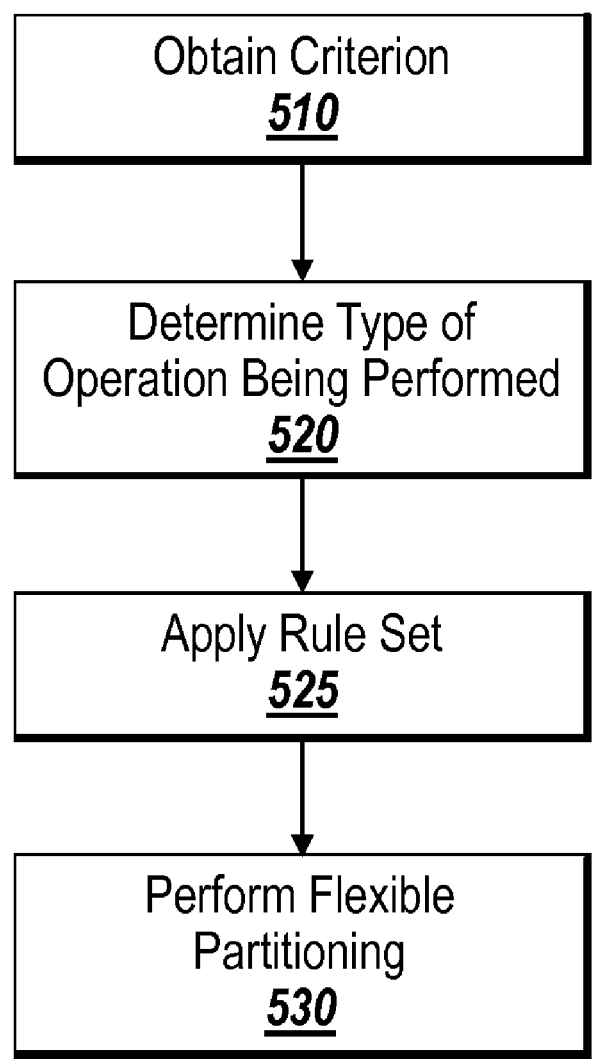
FIG. 5 is a flow diagram depicting another illustrative embodiment of a method of the present invention.

In some embodiments, the step of performing an analysis (step 420) comprises determining the type of operation to be performed on a distributed array. In some further embodiments, the determination of the type of operation to be performed on a distributed array determines a rule set to be used to perform flexible partitioning. An exemplary embodiment of this methodology can be seen in the flow diagram 500 of FIG. 5. The first step involves obtaining a criterion (step 510). Then the type operation being performed is determined (step 520). Based on the type of operation being performed a rule set is then applied (step 525). Then flexible partitioning may be performed based on an applied rule set (step 530).

In one exemplary embodiment, wherein the criterion is to minimize communication in the parallel computing environment, some of the operations, such as math functions, performed on a distributed array may be grouped into different categories for the purposes of determining how arrays should be distributed before, during and/or after the execution of a particular function. Some examples of possible categories include: Functions with Scalar or Small Vector Results, Unary Element-wise and Other Size Preserving Functions, Reduction Functions of One Data Input, Binary Element-wise Functions, Transpose Functions, and Size/Value-Dependent Functions. Each of these category groups will be discussed in more detail below. It should be understood that this is but one possible category grouping and does not cover all possible functions. Other possible functions, categories and groupings will be apparent to one skilled in the art given the benefit of the disclosure.

The category of Functions with Scalar or Small Vector Results includes the functions that return scalar or small vector (length of the output is the same as the number of dimensions of the input) outputs. Examples of functions in this category include:

det, length, isempty, isequal, isreal, ndims, issparse, isscalar, issorted, isvector, norm, numel, rcond, size, isequalwithequalnans.

An example of an associated rule regarding the distribution of the result of a function included in this category is:

The output of the function is replicated.

The category of Unary Element-wise and Other Size Preserving Functions includes functions that have the characteristic such that if:

$$y=\text{fun}(x)$$

then:

the size of the output y is the same as the size of the input x.

Examples of functions in this category include the one input forms of:

abs, acos, acosh, asin, asinh, atan, atanh, ceil, char, conj, cos, cosh, double, exp, fft, fftn, fix, floor, full, ifft, ifftn, imag, int8, int16, int32, int64, isfinite, isinf, isnan, log, log2, logical, not, pow2, real, reallog, realsqrt, round, sign, sin, single, sinh, sort, sparse, sqrt, tan, tanh, tril, triu, uint8, uint16, uint32, uint64, uminus, uplus.

An example of an associated rule regarding the distribution of the result of a function included in this category is:

The distribution scheme of the output is the same as that of the input.

The category Reduction Functions of One Data Input includes functions that have the characteristic such that if:

$$y=\text{fun}(x, \ldots, \text{dim}, \ldots)$$

then:

The size of the output y has been "reduced" from that of the input x such that the size of the output y in the dimension dim is 1. In some cases, this shrinks the dimensionality of the output y to less than that of the input x.

Examples of functions in this category include:

all, any, cumprod, cumsum, max, min, prod, sum.

An example of an associated rule regarding the distribution of the result of a function in this category is:

The distribution dimension of the output is the same as that of the data input, even if the reduction function operates down the distribution dimension and the entirety of the output y ends up stored locally on one lab.

The category Binary Element-wise Functions includes functions that have the characteristic such that if:

$$z=\text{fun}(x,y)$$

and the size of the input x is the same as the size of the input y, or one of x and y is a scalar (the scalar expansion case)

then:

the size of the output z is the same as that of x if the inputs are the same size, otherwise the size of the output z is the size of the non-scalar input.

Examples of functions in this category include the two input forms of:

and, bitand, bitcmp, bitget, bitor, bitset, bitshift, bitxor, eq, ge, gt, le, lt, ldivide, max, min, minus, mod, ne, or, plus, pow2, power, rdivide, rem, times, xor.

An example of associated rules regarding the distribution of the result of a function in this category is:
- In the case of two same-sized distributed inputs, the distribution scheme of the result y is that of the left-most input x.
- In the case of two same-sized inputs, if one is distributed and the other is replicated, then the result is replicated.
- For the scalar expansion case, the non-scalar input provides the distribution scheme of the output. If the non-scalar operand is replicated, then the output will also be replicated.

The category of Transpose Functions includes functions that have the characteristic such that if:

$y = \text{fun}(x)$ and:
the size of the input x is m-by-n
then:
the size of the output y is n-by-m Examples of functions in this category include:
transpose, ctranspose.

An example of associated rules regarding the distribution of the result of a function in this category is:
The distribution dimension of the output y is the dimension of the input x that is not distributed. The partition of the output y is the same as that of the input x.

The category Size/Value-Dependent Functions includes functions that have the characteristic such that:
The size of the output cannot be deduced simply from the size of the inputs. Instead, it relies on the value of the inputs. For example:

$A(I1, I2, \ldots, IN) = RHS$ can have any number of impacts on the resulting size of A. Some choices include:
Reduce the size of A in any one dimension.
Increase the size of A in an existing dimension or dimensions.
Increase the number of dimensions of A.

Examples of functions in this category include:
diag, fft, find, permute, reshape, subsasgn, subsref.

An example of associated rules regarding the distribution of the result of a function in this category is the following subset of cases for the function subsref.

$B = A(:)$

For the indexing expression B=A(:), where the size of A is szA, the distribution dimension of A is dim and the partition of A is par.
If dim is the last dimension, then perform the A(:) indexing operation locally.
If dim is not the last dimension, then the indexing operation A(:) may not be performed locally and communication may be required.
In both cases, the distribution dimension of the output B is 1, and the partition of B is given by the MATLAB expression prod (szA([1:dim−1, dim+1:end]))*par.
B=A (:, q)
If A is a matrix distributed by its second dimension (by columns) and B=A (:, q), where q is a vector of columns selected from A to create B.
If q is a sorted vector in increasing order, then we may perform the indexing operation locally and thereby eliminate communication. Otherwise, communication may be required to preserve the monotonicity of the columns in the output B.

If q is a sorted vector in increasing order, then the columns of A are left on the labs where they are and B is formed using the distribution scheme that falls out. For example, if there are four labs and A is 10-by-16 with four columns on each lab (the default partition), then B=A (:, 12:16) is a 10-by-5 matrix and has a partition of [0 0 1 4]. Forcing B into the default partition of [2 1 1 1] would require moving four of the resulting five columns of B to other labs.

If q is not sorted in increasing order, then the columns of B may move to different labs according to the following algorithm:
First, sort the indices into a new vector sortedQ.
Next, determine how many of those columns of A in sortedQ are on each lab. This determines the partition of B, partitionB.
For example, consider our 10-by-16 matrix A distributed by columns with the default partition from above.
If q=[10 11 16 3 1] then sortedQ=[1 3 10 11 16], defining the partition for B (:, q) as partitionB=[2 0 2 1]

One of ordinary skill in the art will appreciate that the present invention has several advantages. The use of criterion allows for a flexible methodology for guiding the handling of operations on distributed arrays. Providing a pre-defined guiding criterion and relates analysis, rules, and instructions reduces the need for a user to have to specify how to implement flexible partitioning for each instance an operation is preformed. The ability to specify new criterion as well as the underlying analysis, rules, and instructions for flexible partitioning provide a flexible, robust, extensible system for implementing dynamic distribution as new functions, conditions, and situations arise.

It should be understood that the provided embodiments are exemplary in nature. Many alterations and modifications may be made to the present invention, especially the implementations of different criterion and rules, by those having ordinary skill in the art without departing from the spirit and scope of the invention. For example, interpolation and/or extrapolation functionality, such as used for lookup tables, could be implemented using the teachings of the present invention. Therefore, it must be expressly understood that the illustrated embodiments and listed functions have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A computer-implemented method for dynamically distributing distributed arrays in a parallel computing environment, the method comprising:
   receiving a function from a function library, where:
      the function library includes a plurality of functions,
      the function library is part of a MATLAB programming environment operating on a computing device, and
      the function is configured to perform an operation on one or more distributed arrays;
   obtaining a criterion for the distribution of a distributed array;
   performing flexible partitioning using the computing device, where the flexible partitioning includes:
      dynamically determining how to partition the distributed array into the two or more parts processed in parallel in the parallel computing environment, where the dynamically determining includes:
         evaluating the function and the distributed array to which the function will be applied, identifying a partitioning scheme for the distributed array, where the partitioning scheme is identified based on characteristics of the function, and satisfying the obtained criterion with the identified partitioning scheme, and dynamically partitioning the distributed array into the two or more parts based on the determining;

processing the two or more parts in parallel using the parallel computing environment; and producing one or more results based on the processing.

2. The method of claim 1, wherein the criterion is obtained from a user.

3. The method claim 1, wherein the criterion comprises minimizing communication in the parallel computing environment.

4. The method of claim 1 wherein flexible partitioning is performed according to instructions related to the criterion.

5. The method of claim 4, wherein the instructions for performing flexible partitioning are specified by a user.

6. The method of claim 1, where the determining further comprises:

performing analysis based the criterion to determine how to perform flexible partitioning.

7. The method of claim 6, wherein the analysis performed is specified by a user.

8. The method of claim 6 wherein the analysis comprises determining the type operation to be performed on a distributed array.

9. The method of claim 6 wherein the analysis is performed using a rule set.

10. The method of claim 9 wherein the rule set is specified by a user.

11. The method of claim 9 wherein flexible partitioning is performed according to the rule set.

12. A computer-readable medium holding instructions that when executed on a processor dynamically distribute distributed arrays in a parallel computing environment, the instructions performing a method comprising:

receiving a function from a function library, where:

the function library includes a plurality of functions, the function library is part of a programming environment on a computing device, and the function is configured to perform an operation on one or more distributed arrays;

obtaining a criterion for the distribution of a distributed array;

performing flexible partitioning, where the flexible partitioning includes:

dynamically determining, using the computing device, how to partition the distributed array into the two or more parts processed in parallel in the parallel computing environment, where the dynamically determining includes:

evaluating the function and the distributed array to which the function will be applied, identifying a partitioning scheme for the distributed array, where the partitioning scheme is identified based on characteristics of the function, and satisfying the obtained criterion with the identified partitioning scheme, and dynamically partitioning the distributed array into the two or more parts based on the determining;

processing the two or more parts in parallel using the parallel computing environment; and producing one or more results based on the processing.

13. The medium of claim 12, wherein the criterion is obtained from a user.

14. The medium of claim 12, wherein the instructions further comprise:

performing analysis based the criterion to determine how to perform flexible partitioning.

15. The medium of claim 14, wherein the analysis performed is specified by a user.

16. The medium of claim 14 wherein the analysis comprises determining the type operation to be performed on a distributed array.

17. The medium of claim 14 wherein the analysis is performed using a rule set.

18. A system for dynamically distributing distributed arrays in a parallel computing environment, the system comprising:

a processor to:

execute instructions for an application providing a parallel computing environment, obtain a distribution criterion, where the distribution criterion determines, at least in part, how the distributed array is distributed into two or more parts, dynamically determine how to partition the distributed array into the two or more parts so the two or more parts can be processed in parallel in the parallel computing environment, where the dynamically determining includes:

evaluating a function for performing an operation on the distributed array, identifying a partitioning scheme for the distributed array, where the partitioning scheme is identified based on characteristics of the function, satisfying the criterion with the identified partitioning scheme, partitioning the distributed array into the two or more parts based on the determining, and dynamically distributing the two or more parts to parallel computing units executing in the parallel computing environment, where the dynamically distributing is performed according to a dynamic distribution scheme that takes into account the obtained criterion;

a first parallel computing unit executing in the parallel computing environment, the first parallel computing to:

receive a first one of the two or more parts, and process the first one of the two or more parts to produce a first result; and a second parallel computing unit executing in the parallel computing environment, the second parallel computing unit to:

receive a second one of the two or more parts, and process the second one of the two or more parts to produce a second result.

19. The system of claim 18, wherein the dynamic distribution scheme is specified by a user.

* * * * *

UNITED STATES PATENT AND TRADEMARK OFFICE
CERTIFICATE OF CORRECTION

| | |
|---|---|
| PATENT NO. | : 7,743,087 B1 |
| APPLICATION NO. | : 11/387565 |
| DATED | : June 22, 2010 |
| INVENTOR(S) | : Penelope Anderson et al. |

It is certified that error appears in the above-identified patent and that said Letters Patent is hereby corrected as shown below:

At Column 9, Line 30 (Specification) of the printed patent, "A(11, 12,..." should be --A(I1, I2,...--.

At Column 10, Line 27 (Specification) of the printed patent, "preformed" should be --performed--.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,743,087 B1 | Page 1 of 1 |
| APPLICATION NO. | : 11/387565 | |
| DATED | : June 22, 2010 | |
| INVENTOR(S) | : Penelope Anderson et al. | |

It is certified that error appears in the above-identified patent and that said Letters Patent is hereby corrected as shown below:

On the Title Page, at Item (73) Assignee, replace "The Math Works, Inc." with --The MathWorks, Inc.--.

Signed and Sealed this
Eighteenth Day of November, 2014

Michelle K. Lee
*Deputy Director of the United States Patent and Trademark Office*